(12) United States Patent
Wilk et al.

(10) Patent No.: US 11,298,879 B2
(45) Date of Patent: Apr. 12, 2022

(54) METHODS AND DEVICES FOR AUTOMATICALLY CLEARING A PRINT HEAD OF A THREE-DIMENSIONAL PRINTING DEVICE

(71) Applicants: Krzysztof Wilk, Myslowice (PL); Przemyslaw Wolnicki, Klobuck (PL); Filip Turzyński, Sopot (PL); Szymon Kostrzewa, Belsk Duży (PL)

(72) Inventors: Krzysztof Wilk, Myslowice (PL); Przemyslaw Wolnicki, Klobuck (PL); Filip Turzyński, Sopot (PL); Szymon Kostrzewa, Belsk Duży (PL)

( * ) Notice: Subject to any disclaimer, the term of this patent is extended or adjusted under 35 U.S.C. 154(b) by 131 days.

(21) Appl. No.: 16/546,545

(22) Filed: Aug. 21, 2019

(65) Prior Publication Data
US 2020/0061921 A1 Feb. 27, 2020

(30) Foreign Application Priority Data
Jul. 27, 2019 (EP) .................................... 19188730

(51) Int. Cl.
*B29C 64/35* (2017.01)
*B29C 64/209* (2017.01)
*B29C 64/227* (2017.01)
*B29C 64/118* (2017.01)
*B29C 64/321* (2017.01)
*B33Y 30/00* (2015.01)
*B33Y 40/00* (2020.01)

(52) U.S. Cl.
CPC ............ *B29C 64/35* (2017.08); *B29C 64/209* (2017.08); *B29C 64/227* (2017.08); *B29C 64/118* (2017.08); *B29C 64/321* (2017.08); *B33Y 30/00* (2014.12); *B33Y 40/00* (2014.12)

(58) Field of Classification Search
CPC ... B29C 64/118; B29C 64/343; B29C 64/321; B29C 64/307; B29C 64/30; B29C 64/35; B29C 64/209
See application file for complete search history.

(56) References Cited

U.S. PATENT DOCUMENTS

| 10,766,196 | B2 * | 9/2020 | Welling | B29C 64/321 |
| 10,919,223 | B2 * | 2/2021 | MacNeish | B29C 64/209 |
| 2014/0328963 | A1 * | 11/2014 | Mark | B29C 64/209 425/143 |

(Continued)

FOREIGN PATENT DOCUMENTS

| CN | 107498853 A | * | 12/2017 | |
| EP | 3238914 A1 | * | 11/2017 | B65H 51/04 |

(Continued)

*Primary Examiner* — Seyed Masoud Malekzadeh

(57) ABSTRACT

Methods and devices for automatically cleaning a print head within a three-dimensional (3D) printer are disclosed. The methods generally include operating a measurement system (of a 3D printer) to measure an amount of material delivered to a print head of the 3D printer (on a per unit of time basis); detecting a disturbance in the material being delivered to the print head; and retracting the material and then re-introducing the material to the print head. The methods include having a first drive system and a second drive system being used to retract the material and, once the print head is cleaned, to re-introduce the material to the print head with increasing speed from zero to a pre-defined end point speed.

2 Claims, 2 Drawing Sheets

(56) References Cited

U.S. PATENT DOCUMENTS

| | | | | |
|---|---|---|---|---|
| 2015/0165677 A1* | 6/2015 | Ho | ........................ | B29C 64/106 |
| | | | | 425/136 |
| 2015/0165694 A1* | 6/2015 | Lee | ...................... | B29C 64/112 |
| | | | | 425/225 |
| 2016/0052208 A1* | 2/2016 | Debora | .................. | B33Y 50/02 |
| | | | | 264/40.1 |
| 2017/0151704 A1* | 6/2017 | Go | ........................ | B29C 64/209 |
| 2018/0111306 A1* | 4/2018 | Mandel | .................. | B29C 48/92 |
| 2018/0297290 A1* | 10/2018 | Eyal | ...................... | B29C 64/393 |
| 2019/0022725 A1* | 1/2019 | Bauer | ................... | B22F 1/0059 |
| 2019/0055104 A1* | 2/2019 | Hayes | .................. | B29C 64/118 |
| 2020/0047402 A1* | 2/2020 | De Backer | ............ | B29C 64/118 |

FOREIGN PATENT DOCUMENTS

| | | | | |
|---|---|---|---|---|
| EP | 3501795 A1 * | 6/2019 | ............. | B65H 51/10 |
| WO | WO-2016082036 | * | 6/2016 | |

* cited by examiner

METHODS AND DEVICES FOR AUTOMATICALLY CLEARING A PRINT HEAD OF A THREE-DIMENSIONAL PRINTING DEVICE

CROSS-REFERENCE TO RELATED APPLICATIONS

This application claims priority to Poland patent application serial number 7711762, filed on Aug. 22, 2018, and E.U. patent application serial number EP19188730.6, filed on Jul. 27, 2019.

FIELD OF THE INVENTION

The field of the invention relates to three-dimensional printers and, more particularly, to methods and devices for automatically clearing and unblocking print heads within three-dimensional printers.

BACKGROUND OF THE INVENTION

The most common cause of errors in a three-dimensional printing process, particularly for those processes that involve fused filament fabrication, are discontinuities and irregularities in the extrusion of the printing material. Such discontinuities and irregularities result in printed models having defects that negatively impact the strength and visual quality of such models. The defects are often caused by low quality filaments being used during the printing process, e.g., filaments having variable diameters and/or contaminants (dirt) being present within the filaments. Such defects may also be caused by ordinary wear (or contamination) of the printing machine components, particularly the material feed system, the print head, and/or the quantity measurement system of the extruded material.

A number of solutions have previously been proposed and/or developed to address these challenges. For example, a first known solution requires that the feeding system for the printing material be positioned on a stepper motor (or a DC motor), in which a thrust bearing cooperating with the motor feeds the material by a known value in a given direction. Another known solution involves measuring the amount of extruded material using force sensors, optical sensors, and/or encoders, and comparing that measurement to another measurement that is obtained on the motor (which forms a part of the material feeding system). Yet another known solution stops the printing process upon the system detecting an error in extrusion, with the error being detected through measurements of the amount of extruded material, and then manually correcting the problem. For printing machines with more than one printing tool, another known solution involves withdrawing the printing material, after an error is detected by the system based on measurements of the amount of extruded material, after which the printing tool is changed and, thereafter, the printing process is allowed to continue (this solution is effective only when the problem with extrusion results from the wear or soiling of the printing tool). Still further, another known solution, in which printing machines with multiple trays for printing material are being utilized, involves automatically withdrawing the printing material (after an error is detected by the system based on measurements of the amount of extruded material), and then replacing the printing material with new printing material from a second tray, such that the printing process may then resume (this solution is effective only in the case where the problem of extrusion is due to material defects).

As explained above, there have been certain solutions developed over the years to address discontinuities in the extrusion of printing material; however, such currently-available solutions are often cumbersome, inefficient, and/or labor-intensive. Accordingly, a continuing need in the marketplace exists for new and improved methods for addressing such discontinuities (and for automatically clearing and unblocking a print head within a three-dimensional printer). As the following will demonstrate, the systems and methods of the present invention address such needs in the marketplace.

SUMMARY OF THE INVENTION

According to certain preferred aspects of the present invention, methods and devices for addressing discontinuities in the extrusion of printing material (within a three-dimensional printer) are provided—and for automatically clearing and unblocking a print head within a three-dimensional printer. The invention provides that such methods and devices are configured to remove the source of the problems associated with the quality of extrusion—and, once such problems are resolved, to allow the printing process to resume without user intervention. More particularly, the methods and devices of the present invention utilize a second (auxiliary) drive system that is configured to feed/deliver the printing material to a print head during a printing process, along with executing a cleaning process that changes based on the direction and speed of material feeding.

Still more particularly, such methods generally include (1) operating a measurement system to measure an amount of printing material being delivered (fed) to a print head by a propulsion system of the 3D printer (on a per unit of time basis); (2) detecting a disturbance in the printing material being delivered to the print head; and (3) retracting the material and then re-introducing the material to the print head, with a first drive system (a first motor) and a second drive system (a second motor) being used to retract the material and to re-introduce the printing material to the print head with increasing speed from zero to a pre-defined end point speed.

The invention further encompasses three-dimensional printers that comprise a first drive system (a first motor) and a second drive system (a second motor), which are configured to retract printing material and to re-introduce the printing material to the print head as described herein (for automatically clearing and unblocking a print head within a three-dimensional printer).

The above-mentioned and additional features of the present invention are further illustrated in the Detailed Description contained herein.

DETAILED DESCRIPTION OF THE INVENTION

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used, and made without departing from the scope and spirit of the invention.

Figure 1:
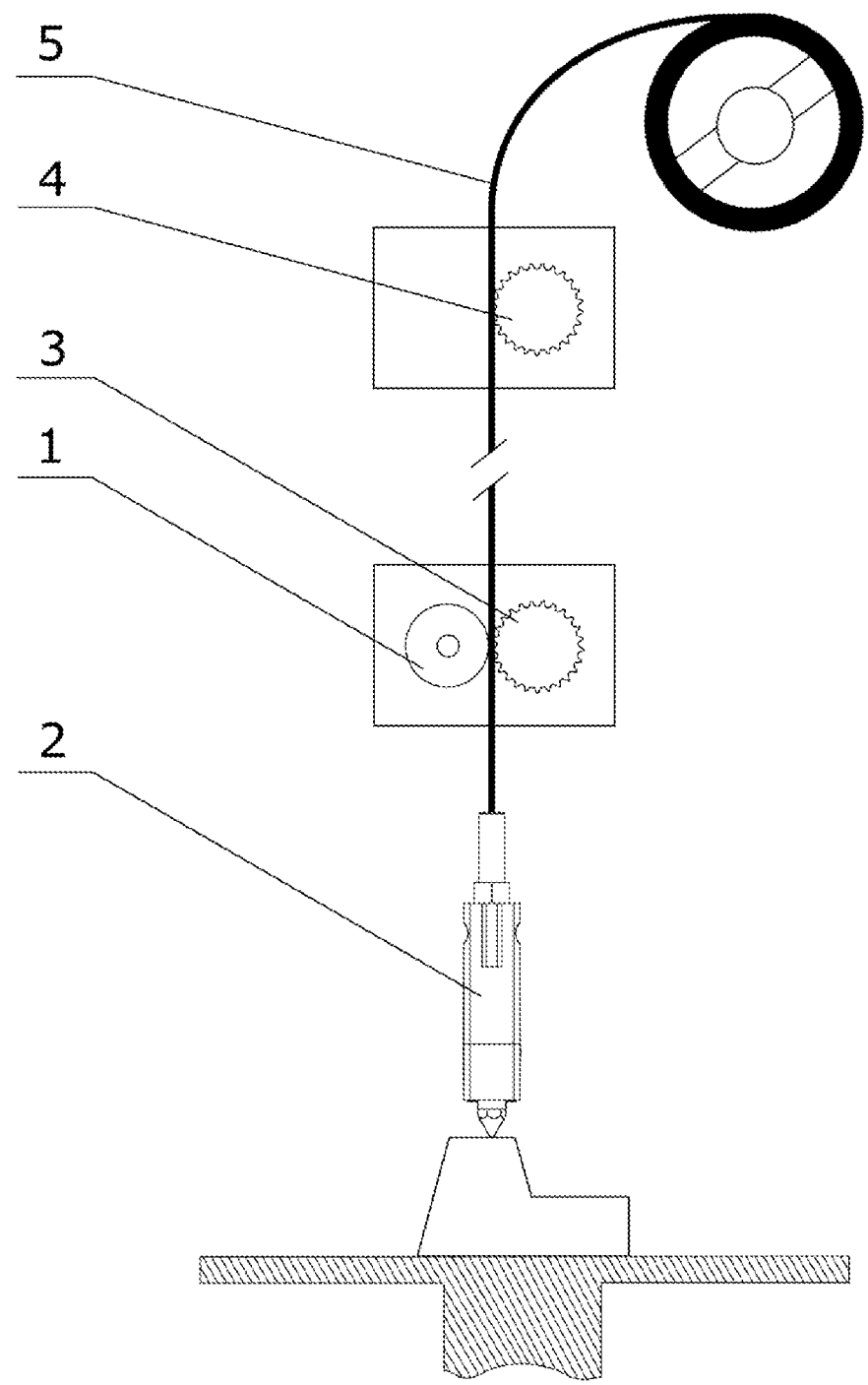
FIG. 1 is a diagram that illustrates a first drive system (a first motor) and a second drive system (a second motor), which are configured to retract printing material and to re-introduce the printing material to the print head (when such process is needed to address discontinuities in the extrusion of printing material and for automatically clearing and unblocking the print head when such discontinuities are detected).
Figure 2:
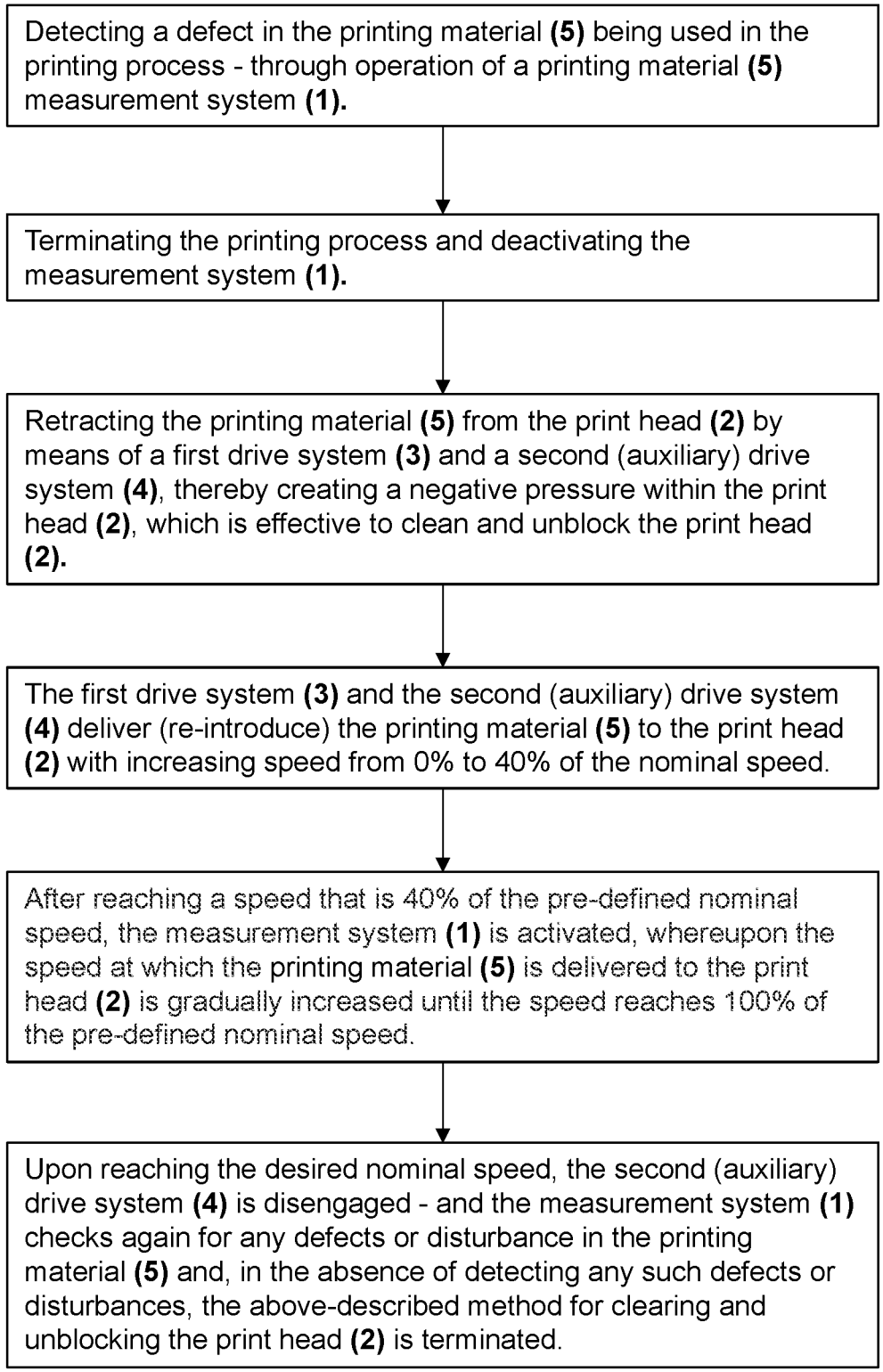
FIG. 2 is a flow diagram that generally describes and summarizes the methods described herein.

Referring now to FIGS. 1 and 2, the methods of the present invention begin by first detecting a defect in the printing material (5) being used in the printing process. The defect is preferably detected by measuring, over a defined period of time, an amount of extruded printing material (5) using a measurement system (1). The measurement system (1) may include force sensors, optical sensors, and/or encoders (i.e., a device that is configured to detect an anomaly in the amount of printing material (5) that has been extruded over a defined period of time, e.g., configured to detect when the amount of printing material (5) falls outside the expected normal range). The measurement system (1) will include or otherwise be operably connected to a controller board (i.e., a central processor)—which, along with the sensors and/or encoders, will be configured to detect the defect in the printing material (5). Upon detecting a defect in the printing material (5), the printing process is stopped (or paused), and the print head (2) is caused to move away from the print area. At that time, the measurement system (1) is also preferably deactivated or turned off.

After the measurement system (1) is deactivated, 1 cm to 40 cm of the (filament) printing material (5) is retracted by means of a first drive system (3) and a second (auxiliary) drive system (4), thereby creating a negative pressure within the nozzle of the print head (2). Each of the first drive system (3) and the second (auxiliary) drive system (4) will include its own motor and means for engaging the printing material (5), e.g., a frictional surface and/or mechanical elements that are configured to grip and move the printing material (5). At this point in the method, the invention provides that the pressure generated in the print head (2) has been effective to clean, clear, and remove dirt and other contaminants from the printing material (5) and print head (2).

The positions of the first drive system (3) and second (auxiliary) drive system (4) are important. For example, the invention provides that the first drive system (3) will preferably be positioned closer to the print head (2) than the second (auxiliary) drive system (4); and the second (auxiliary) drive system (4) is preferably positioned at least 40 cm from the print head (2)—as shown in FIG. 1. The printing material (5) will need to be retracted and later re-introduced to the print head (2) after the print head (2) has been cleared (as described herein). After the (filament) printing material (5) is retracted 1 cm to 40 cm, in the event that such retraction step causes the printing material (5) to be moved beyond the range that the first drive system (3) may still engage such printing material (5), the second (auxiliary) drive system (4) will still be in contact with the printing material (5)—and thus able to finish the retraction step and facilitate the subsequent re-introduction of the printing material (5) to the print head (2) (as explained below). This arrangement is particularly important when the printing material (5) has been damaged or severed within the range that is only accessible by the first drive system (3)—which, in that instance, the ability of the second (auxiliary) drive system (4) to stay engaged with the printing material (5) is critical.

As mentioned above, after the print head (2) has been cleared, the invention provides that the first drive system (3) and the second (auxiliary) drive system (4) are then brought forward—and the printing material (5) is delivered (fed) to the print head (2) with increasing speed from 0% to 40% of the nominal speed (with the nominal speed being a desired/pre-defined end point speed). The invention provides that, in certain embodiments, after reaching a speed that is 40% of the pre-defined end point speed, such as 40% of such speed, the measurement system (1) is activated, whereupon the speed at which the printing material (5) is delivered to the print head (2) is gradually increased until the speed reaches 100% of the pre-defined end point speed. In other embodiments, after the extrusion of at least 1 cm of printing material (5), the measurement system (1) for the extruded printing material (5) is reactivated (switched on), whereupon the printing material (5) feed speed is gradually increased until the desired nominal speed is reached.

The invention provides that—upon reaching the desired nominal speed—the auxiliary drive system (4) is disengaged. Finally, the measurement system (1) checks again for any defects or disturbance in the printing material (5) and, in the absence of detecting any such defects or disturbances, the above-described method for clearing and unblocking the print head (2) is terminated. Conversely, if the measurement system (1) still detects a defect or disturbance in the printing material (5), the above-described process of clearing and unblocking the print head (2) is repeated.

The invention further encompasses three-dimensional printers that comprise a first drive system (3) (a first motor) and a second (auxiliary) drive system (4) (a second motor), which are configured to perform the methods described herein. More particularly, the invention encompasses three-dimensional printers that include a first drive system (3) and a second drive system (4) that are both configured to retract printing material (5) (after detecting a disturbance or discontinuity in the printing material (5)) and to re-introduce the printing material (5) to the print head (2) by following the methods described herein (to automatically clear and unblock the print head (2) within the three-dimensional printer). Of course, as those of ordinary skill in the art will understand, in addition to the first drive system (3) and second drive system (4), the printers will include the customary additional components that are needed to construct and operate a functional three-dimensional printer. In addition to the components described herein, such customary components include a controller board (i.e., a central processor that communicates with and instructs the various components of the printer to perform the actions and the methods described herein); a user interface through which a user may send instructions to the controller board; a frame or chassis of the printer; a print bed; motion components (those components that are configured for movement of the printer within the x-, y-, and z-axis); stepper motors and belts (to enable movement of the printer); threaded rods (enabling movement across the z-axis); end stops; a power supply unit; a print head (or the extruder), and a feeder system.

The invention provides that an advantage of the present invention is that it reduces (or eliminates) the amount of downtime of the three-dimensional printer (when discontinuities in printing material (5) occur). The invention provides that employing two drive systems (3)/(4) (instead of just a single drive system, as in prior art printers) allows the three-dimensional printer to obtain high negative pressures within or near the print head (2), which allow dirt and degraded material to be forced out of the printing nozzle of the print head (2). The invention further provides that the second point of contact with the printing material (5), enabled by the presence of the second (auxiliary) drive system (4), allows the printing material (5) to be traversed—despite the lack of printing material (5) contact with the roller of the printer to guide the main engine of the extrusion system. Yet another advantage is that the user of the three-dimensional printer is not involved in the action of removing the cause of the extrusion error. Furthermore, possibility of problems associated with a prolonged three-dimensional printing process, particularly long-term heating of the printing material (5) in the print head (2), is eliminated (due to the above-described cleaning process taking place immediately after detection of an error in extrusion).

The many aspects and benefits of the invention are apparent from the detailed description, and thus, it is intended for the following claims to cover all such aspects and benefits of the invention which fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A three-dimensional (3D) printer that is configured to automatically execute a method that cleans a print head of the printer, wherein the printer comprises:
   (a) a measurement system that is configured to (i) measure an amount of printing material delivered to the print head by a propulsion system of the printer, on a per unit of time basis, and (ii) detect a disturbance in the printing material being delivered to the print head; and
   (b) a first drive system and a second drive system that are configured to retract the printing material, upon the measurement system detecting the disturbance in the printing material, and then re-introduce the printing material to the print head with increasing speed from zero to a pre-defined end point speed, wherein:
      (i) the measurement system is configured to be deactivated prior to the re-introducing the printing material to the print head; and
      (ii) the measurement system is configured to be activated after the printing material reaches a speed that is 1% to 40% of the pre-defined end point speed, whereupon the first drive system and the second drive system are configured to gradually increase the speed at which the printing material is delivered to the print head until the speed reaches 100% of the pre-defined end point speed.

2. The three-dimensional (3D) printer of claim 1, wherein the measurement system is configured to be deactivated immediately upon detecting the disturbance in the printing material being delivered to the print head.

\* \* \* \* \*